(12) United States Patent
Sacco et al.

(10) Patent No.: US 12,420,687 B2
(45) Date of Patent: Sep. 23, 2025

(54) TRIM SUPPORT MEMBER

(71) Applicant: LEAR CORPORATION, Southfield, MI (US)

(72) Inventors: Jason Sacco, West Bloomfield, MI (US); Laura Schulz, Bloomfield Hills, MI (US); Ronald L. Miotto, Canton, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/749,453

(22) Filed: May 20, 2022

(65) Prior Publication Data

US 2022/0379785 A1 Dec. 1, 2022

Related U.S. Application Data

(60) Provisional application No. 63/194,746, filed on May 28, 2021.

(51) Int. Cl.
*B60R 21/16* (2006.01)
*B60N 2/58* (2006.01)
(Continued)

(52) U.S. Cl.
CPC .................. *B60N 2/5883* (2013.01)

(58) Field of Classification Search
CPC ...... B60N 2/5825; B60N 2/5841; B60N 2/58; B60N 2/6009; B60N 2/68; B60R 21/026
See application file for complete search history.

(56) References Cited

U.S. PATENT DOCUMENTS 2,575,548 A * 11/1951 Carter .................. B60N 2/60
297/228.1
5,139,311 A * 8/1992 Imai .................... B60R 22/02
297/481
(Continued)

FOREIGN PATENT DOCUMENTS

CN 208698726 U 4/2019
CN 210970764 U 7/2020
(Continued)

OTHER PUBLICATIONS

Chinese Office Action (with English Machine Translation) Dated Sep. 1, 2023, Application No. 202210601253.9, Applicant: Lear Corporation, 18 Pages.
(Continued)

*Primary Examiner* — Shin H Kim
(74) *Attorney, Agent, or Firm* — Brooks Kushman P.C.

(57) ABSTRACT

A trim cover assembly includes a trim cover disposable on a seat cushion, the trim cover having an A-side defining an occupant surface and a B-side, opposite the A-side, facing an external surface of the seat cushion. The trim cover defines a support area which, when disposed over the seat cushion, corresponds to a seat belt buckle and a recess corresponding to the seat belt buckle. The trim cover assembly also includes a trim support member secured on the B-side of the trim cover, and corresponding to at least a portion of the support area. The trim support member defines an engagement region for engaging a seat frame to form a support extension from the seat frame to provide support to the trim cover over the seat belt buckle and recess.

20 Claims, 4 Drawing Sheets

(51) Int. Cl.
*B60R 21/215* (2011.01)
*B60R 22/00* (2006.01)

(56) References Cited

U.S. PATENT DOCUMENTS

| | | | | |
|---|---|---|---|---|
| 5,158,339 A * | 10/1992 | Miyanaga | .............. | B60R 22/26 |
| | | | | 297/224 |
| 5,700,055 A * | 12/1997 | Davidson | .............. | B60N 2/832 |
| | | | | 297/378.12 |
| 5,785,381 A * | 7/1998 | Carter | .............. | B60N 2/6054 |
| | | | | 297/DIG. 6 |
| 6,672,662 B1 * | 1/2004 | Balk | .............. | B60N 2/3047 |
| | | | | 297/238 |
| 7,104,570 B2 * | 9/2006 | Hearn | .............. | B60R 22/023 |
| | | | | 280/801.1 |
| 7,275,786 B2 * | 10/2007 | Kobayashi | .............. | B60N 2/58 |
| | | | | 297/228.11 |
| 7,419,209 B1 * | 9/2008 | Mangiapane | .............. | H01M 50/244 |
| | | | | 296/63 |
| 7,458,636 B2 * | 12/2008 | Chen | .............. | B60N 2/2803 |
| | | | | 24/301 |
| 7,686,392 B2 * | 3/2010 | Kenny | .............. | B60N 2/6018 |
| | | | | 297/229 |
| 7,879,425 B2 | 2/2011 | Schulte et al. | | |
| 8,678,497 B2 * | 3/2014 | Kyogoku | .............. | B60N 2/206 |
| | | | | 297/232 |
| 8,733,834 B2 * | 5/2014 | Palmer | .............. | B60N 2/585 |
| | | | | 297/218.4 |
| 8,960,791 B2 * | 2/2015 | Dry | .............. | B60N 2/68 |
| | | | | 297/452.42 |
| 9,039,096 B2 * | 5/2015 | Nakanishi | .............. | B60R 22/26 |
| | | | | 297/481 |
| 9,056,568 B2 * | 6/2015 | Matsumoto | .............. | B60N 2/4228 |
| 9,061,618 B2 * | 6/2015 | Nakagawa | .............. | B60N 2/5825 |
| 9,061,647 B2 | 6/2015 | Steinbrecher | | |
| 9,352,676 B1 * | 5/2016 | Wright | .............. | B60N 2/2893 |
| D792,727 S * | 7/2017 | Kataoka | .............. | D6/716.4 |
| D792,728 S * | 7/2017 | Kataoka | .............. | D6/716.4 |
| D794,986 S * | 8/2017 | Kataoka | .............. | D6/716.4 |
| 9,845,032 B1 * | 12/2017 | Line | .............. | B60N 2/6009 |
| 9,981,581 B2 * | 5/2018 | Okuhara | .............. | B60N 2/5833 |
| 10,005,376 B2 * | 6/2018 | Supernavage | .............. | B60N 2/68 |
| D837,547 S * | 1/2019 | Perry | .............. | D6/356 |
| D837,548 S * | 1/2019 | Perry | .............. | D6/356 |
| D837,550 S * | 1/2019 | Buffery | .............. | D6/356 |
| 10,189,378 B2 * | 1/2019 | Jackson | .............. | B60N 2/3097 |
| 10,220,739 B2 * | 3/2019 | Okuhara | .............. | B60N 2/58 |
| D849,432 S * | 5/2019 | Perry | .............. | D6/356 |
| D855,340 S * | 8/2019 | Buffery | .............. | D6/356 |
| D855,341 S * | 8/2019 | Perry | .............. | D6/356 |
| 10,399,472 B2 * | 9/2019 | Iwakata | .............. | B60N 2/7011 |
| 10,486,564 B2 * | 11/2019 | Baba | .............. | B60N 2/686 |
| 10,538,180 B2 * | 1/2020 | Nishimoto | .............. | B60N 2/5825 |
| D874,171 S * | 2/2020 | Perry | .............. | D6/356 |
| D874,172 S * | 2/2020 | Buffery | .............. | D6/356 |
| 10,604,040 B2 * | 3/2020 | Clauser | .............. | B60N 2/897 |
| 10,618,440 B2 * | 4/2020 | Kamei | .............. | B60N 2/58 |
| 10,933,781 B2 * | 3/2021 | Yang | .............. | B60N 2/688 |
| 11,135,951 B2 * | 10/2021 | Marquès | .............. | B60N 2/5858 |
| 11,247,591 B2 * | 2/2022 | Nishimoto | .............. | B60N 2/5883 |
| 11,407,348 B2 * | 8/2022 | Fujita | .............. | B60N 2/6027 |
| 11,639,151 B2 * | 5/2023 | Jovicevic | .............. | B60N 2/688 |
| | | | | 280/801.1 |
| 11,654,805 B2 * | 5/2023 | Yang | .............. | B60N 2/6009 |
| | | | | 297/218.1 |
| 12,083,936 B2 * | 9/2024 | Sel | .............. | B60N 2/5858 |
| 2003/0062759 A1 * | 4/2003 | Gupta | .............. | B60N 2/3013 |
| | | | | 297/452.65 |
| 2004/0113410 A1 * | 6/2004 | Morino | .............. | B60N 2/309 |
| | | | | 297/331 |
| 2006/0255647 A1 * | 11/2006 | Hyatt | .............. | B60R 22/22 |
| | | | | 297/468 |
| 2008/0136237 A1 * | 6/2008 | Kayumi | .............. | B60N 2/914 |
| | | | | 297/284.9 |
| 2009/0295215 A1 * | 12/2009 | Galbreath | .............. | B60N 2/5825 |
| | | | | 297/452.6 |
| 2011/0254332 A1 * | 10/2011 | Parida | .............. | B60N 2/3065 |
| | | | | 24/682.1 |
| 2013/0093233 A1 | 4/2013 | Kajihara | | |
| 2013/0119730 A1 * | 5/2013 | Nakagawa | .............. | B60N 2/58 |
| | | | | 297/218.1 |
| 2014/0110988 A1 * | 4/2014 | Nakanishi | .............. | B60N 2/70 |
| | | | | 297/481 |
| 2016/0250948 A1 * | 9/2016 | Sekino | .............. | B60N 2/6009 |
| | | | | 297/452.48 |
| 2018/0326914 A1 * | 11/2018 | Coyle | .............. | B60N 2/01 |
| 2018/0354396 A1 * | 12/2018 | Kuscu | .............. | B60N 2/803 |
| 2018/0370482 A1 * | 12/2018 | Tago | .............. | B60N 2/64 |
| 2019/0009969 A1 * | 1/2019 | Ohtsu | .............. | B68G 7/10 |
| 2020/0398718 A1 * | 12/2020 | Watanabe | .............. | B60R 22/26 |
| 2020/0406798 A1 * | 12/2020 | Singh | .............. | B64D 11/064 |
| 2021/0323498 A1 * | 10/2021 | Jovicevic | .............. | B60N 2/688 |
| 2022/0379785 A1 * | 12/2022 | Sacco | .............. | B60N 2/5883 |
| 2022/0402416 A1 * | 12/2022 | Yang | .............. | B60N 2/6009 |
| 2023/0095604 A1 * | 3/2023 | Krumbein | .............. | B60N 2/6009 |
| | | | | 297/250.1 |
| 2024/0391372 A1 * | 11/2024 | Tanaka | .............. | B60N 2/0264 |

FOREIGN PATENT DOCUMENTS

| | | |
|---|---|---|
| DE | 10 2012 220 643 A1 | 11/2012 |
| DE | 10 2019 206 662 A1 | 11/2019 |
| JP | 2013-203090 A | 10/2013 |
| JP | 2015223872 A | 12/2015 |
| WO | 2013/135871 A1 | 9/2013 |

OTHER PUBLICATIONS

Chinese Office Action for CN App. No. 202210601253.9 dated May 31, 2024 and Machine Translation, 16 pages.
DE Office Action for DE Application No. 10 2022 113 438.5 dated Jun. 14, 2023, and Machine Translation, 16 pages.

* cited by examiner

TRIM SUPPORT MEMBER

CROSS-REFERENCE TO RELATED APPLICATIONS

This application claims the benefit of U.S. provisional application Ser. No. 63/194,746 filed May 28, 2021, the disclosure of which is hereby incorporated in its entirety by reference herein.

TECHNICAL FIELD

The present application is directed to a seat assembly, and more particularly, a seat assembly with a trim support member engaged with the seat frame.

BACKGROUND

Vehicle seats having seat bottoms and seatbacks typically include foam cushions disposed on a seat frame to provide support to vehicle occupants. The cushions include a trim cover disposed thereon to provide an aesthetically pleasing appearance for the occupant support surface. The seats may include various fixtures for attaching trim covers to the seat frame.

SUMMARY

According to one or more embodiments, a trim cover assembly includes a trim cover defining a support area for covering a seat belt buckle when the trim cover is covering a seat in the loading position. The trim cover assembly also includes a trim support member on the B-side of the trim cover with a support region positioned according to the support area. The trim cover assembly is engageable with a seat frame, with the trim support member engaging a receptacle on the seat frame. Thus, the trim support member provides structural support to the support area where the seat frame or cushion would otherwise not support, thus improving the finish and closeout appearance of the trim cover. A method for securing the trim cover assembly to a seat assembly is also provided.

DETAILED DESCRIPTION

Figure 1:
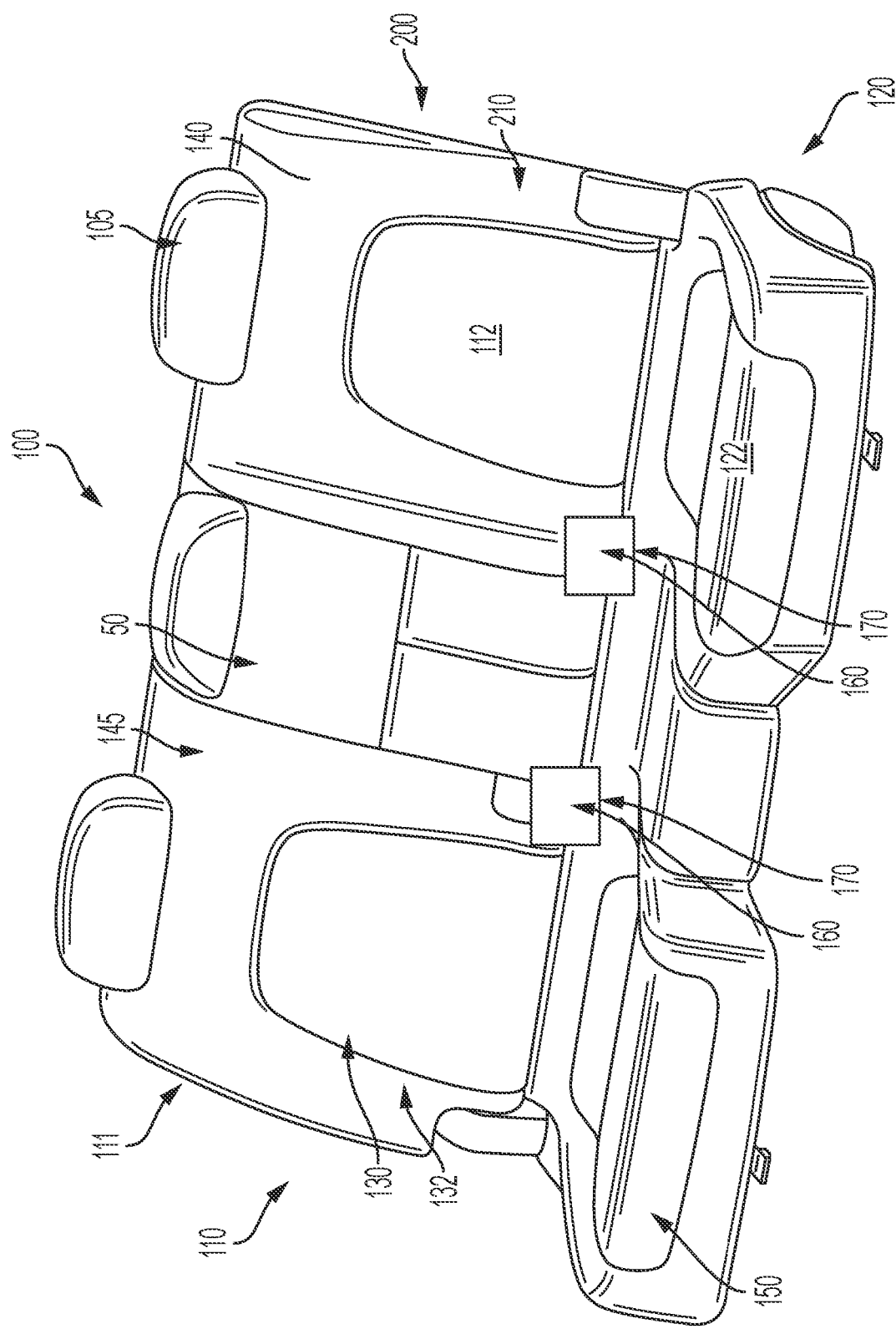
FIG. 1 is a perspective schematic illustration of a representative vehicle seat assembly, according to at least one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

According to one or more embodiments, a seat assembly includes a trim cover assembly configured to cover a seat belt buckle on a rear side of the seat when the seats of the seat assembly are in a folded position (with the rear side of the seatback facing upward). At junctures between the seat cushion components and other features that are housed in recesses in the seat assembly, such as seat belt buckles, plastic latches, handles, and bezels, and at curves and corners of the seatback design, the trim cover may have corresponding recesses and/or may lack support thereunder at the edges of the components, especially when in the folded position where recesses are included to prevent obstruction of the folding due to the components. As such, the trim cover assembly is disposed on seat and includes a trim support member to provide structural support to the trim cover in areas without the seat frame. These areas include areas without a trim cover, or areas without other support (e.g., a cushion) for the trim cover, such as the seat belt buckle area. The trim cover assembly includes a trim cover with the trim support member on the B-side of the trim cover, and secured thereon (e.g., via sewing) such that when installed on the seatback, the trim support member can extend across the rear side of the seat. The size and shape of the trim support member is selected based on the support area of the trim cover required to cooperate with the design of the seat. In the embodiments shown in the Figures, described by reference herein, the trim support member is generally an L-shaped body, with a first portion of the body of the trim support member defining an engagement region for engagement with a seat frame, on a first side of the seat frame. The body of the trim support member includes a second portion for extending around to a second side of the seat frame, opposite to the first side, to further support the engagement between the trim support member and the seat frame. The engagement region of the trim support member is configured to engage a receptacle located on the seat frame such that the trim support member forms an extension of the metal frame to provide support for the support area of the trim cover. For example, to the trim cover for covering the seat belt buckle (and corresponding recess) when the seat is in the folded position, without requiring additional frame or cushion components.

Referring now to the figures, like numerals are used to designate like structure throughout to the drawings, a schematic vehicle seat assembly in accordance with at least one embodiment of the present disclosure is generally shown at by seat assembly 100 in FIG. 1.

Referring to the figures, in at least the illustrated embodiment, the seat assembly 100 may be adapted for use in a motor vehicle, such as a car or truck, or may be used in with other seat assemblies including in aircraft, theater seats or any suitable seat assemblies, and the discussion of the seat assembly 100 in a vehicle is not intended to be limiting. While the seat assembly 100 is illustrated in FIG. 1 to be a bench seat assembly, it should be understood that the principles of the present disclosure are applicable to other types of seat assemblies, such as bucket, captain, and other types of seat assemblies. Furthermore, although shown as a rear seat assembly, the seat assembly 100 may be adapted as any row of seating in the vehicle, and the depiction of a rear seat assembly is not intended to be limiting. As shown in FIG. 1, the vehicle seat assembly 100 includes a seatback 110 and a seat bottom 120, connected to form seat assembly 100 for supporting an occupant in the vehicle. The seat bottom 120 may be mounted on a seat frame (not shown in FIG. 1) which may be removably secured to the vehicle floor. The seat bottom 120 is usable with any type of seatback 110 to form the vehicle seat 100. In certain embodiments, the seatback 110 and seat bottom 120 are made of the same construction. However, it should be understood that the construction of the seatback 110 can differ from the construction of the seat bottom 120. In some embodiments, as in the example shown in FIG. 1, the seatback 110 may include a head restraint 105. In other embodiments, the head restraint 105 may be omitted.

The seatback 110 may be pivotally mounted to seat bottom 120 such that the seatback 110 can be reclined or adjusted relative to the seat bottom 120, or folded into a loading position onto the seat bottom 120 (e.g., for expanded cargo storage).

The seatback 110 may include a release handle (not shown) which engages a mechanism connected to the seat frame to fold the seatback 110 from a sitting position (as shown in FIG. 1) into a loading position (shown for one or more sections of the seat assembly 100 in FIGS. 8-9) with the seatback 110 being folded onto the seat bottom 120. In the loading position, cargo can be loaded onto the rear surface 114 of the seatback 110. As such, in some embodiments, the seatback 110 may be formed as a unitary structure, or in other embodiments (as shown in FIGS. 6-9) may be any sectional configuration commonly known such that a first section 140 of the seatback 110 can fold independently of another section 145 of the seatback 110, and in certain further embodiments, each section 140, 145 may fold independently of a third section. For example, some possible configurations for the seatback 110 include a 60/40 configuration, a 50/50 configuration, or a 40-20-40 configuration.

In at least one embodiment, each of the seatback 110 and seat bottom 120 include foam cushion 130, 150, respectively. The foam cushion 130, 150 can be conventionally secured to a seat frame (not shown in FIG. 1) by any method generally known in the art. Each foam cushion 130, 150 may be one or more foam parts, joined together to form the seat component. For example, the seatback 110 foam cushion 130 may include side bolster portions 132, or any other components to meet a desired design. The foam cushions 130, 150 can have any suitable size and be formed from any suitable configuration of components. The seatback foam cushion 130 and the seat bottom foam cushion 150 can independently comprise any suitable comfort foam material such as, but not limited to, a suitable resilient polymer, and can independently be formed in any suitable manner. For example, the foam cushions 130, 150 may be formed of conventional polyurethane foam, soy-based foam, silicone, thermoplastic olefins, thermoplastic urethanes, and/or natural oil-based expanded polyurethanes, soy-based polyurethane, polymer fibers, non-woven polyester pads, latex foams and the like. The foam cushions 130, 150 are formed of any suitable comfort material that provides soft resilience as the seat assembly is deflected during use when an occupant is in a seated position. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM test method No. D3574.

The seat assembly 100 also includes trim cover assembly 200 adapted to engage the foam cushions 130, 150 in a covering relationship. The trim cover assembly 200 may be secured to the foam cushions 130, 150 in any suitable manner, such as, but not limited to, by mechanical fasteners or heat forming. The trim cover assembly 200 includes a trim cover 210, which may comprise any material commonly known in the art. By way of example, some of the known materials include cloth, fabric, leather, synthetic leather, vinyl, synthetic suede, non-woven fabric, or combinations thereof (fabric-to-fabric, leather-to-leather, fabric-to-leather, leather-to-fabric, etc.), or polymers of sufficient quality and thickness for use in seat trim applications. Polymer trim materials may include a flexible closed cell polymer skin material such as polyvinyl, polyvinyl chloride (PVC), thermoplastic olefin (TPO), or thermoplastic urethane (TPU). Additionally, materials for use as layers of the trim cover 210 may include a foam backing (not shown, but generally known in the art) which may be manufactured from a variety of polymer foam materials. By way of example, the foam backing may be polyethylene, polypropylene, polyurethane, or a polystyrene foam. Optionally, other layers such as a mesh or reinforcing material (not shown, but generally known in the art) such as fiberglass or nylon may be applied to the foam backing or back of the trim cover 210 for increasing strength without increasing rigidity. The trim cover assembly 200 provides an occupant seating surface 112, 122 for the seatback 110, and seat bottom 120, respectively. The occupant seating surface 112, 122 is formed on the A-side of the seat assembly 100, which is the external surface visible to the occupant. It should be understood that the cushion 130 for the seatback 110 can differ from the cushion 150 of the seat bottom 120. Likewise, it should be understood that the trim cover assembly 200 for the seat back 110 can differ from the trim cover assembly for the seat bottom 120. Moreover, it should be understood that the trim cover 210 may comprise any number of pieces of similar or different trim materials to form the trim cover assembly 200 to cover the cushions 130, 150 in an aesthetically pleasing manner as based on the desired design of the seat assembly 100. For example, a first material my be used on the occupant support side of the seat assembly 100, and the seat assembly 100 may include a separate material on the rear or under side of the seat assembly 100, such as on a rear surface 114 of the seatback 110.

Referring again to FIG. 1, the foam cushions 130, 150 of seatback 110 and seat bottom 120 may include various components secured to the seat frame (not shown in FIG. 1) that provide various functions, such as, but not limited to, seat belt buckles 160, disposed within one or more recesses 170 defined in the seat assembly 100. Although the embodiments hereinafter will discuss the component as seat belt buckles 160, this is not intended to be limiting, and the recess 170 may provide access to any suitable component which may or may not be attached to the seat frame (not shown in FIG. 1), the vehicle frame (not shown), or the vehicle body (not shown) and requires trim support near the recess 170. As such, although shown as two recesses 170 defined in the seatback 110 and the seat bottom 120, the recess 170 may be any number of recesses and may be any suitable shape and depth and may be positioned in any suitable location of the seat assembly 100 as based on the desired design of the seat assembly 100 for the component included in the seat assembly 100. For example, the recess 170 may be defined only in the seatback 110, only in the seat bottom 120, or in both the seatback 110 and the seat bottom 120 which cooperate to form the recess 170.

In the embodiments described herein, the recess 170 may be configured to allow for the folding of the seatback 110 over the seat bottom 120 without the obstruction from the seat belt buckles 160. For example, in the embodiment shown in FIG. 1, the recess 170 may be defined in the region where seatback 110 and seat bottom 120 meet, and may be positioned on the inboard side (or occupant support side) of a 60/40 split configuration, in other embodiments, the recess 170 may be located in different locations in different embodiments and different configurations.

Figure 9:
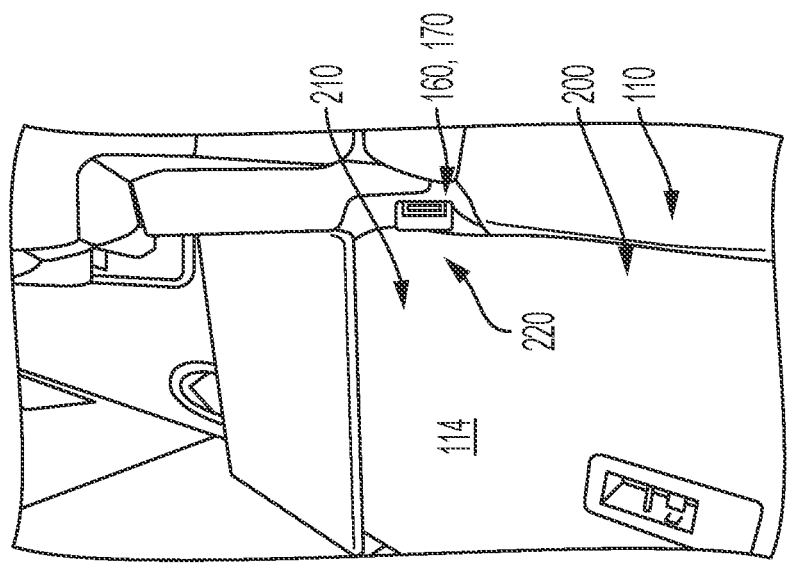
FIG. 9 is a perspective view of the rear surface of the vehicle seat, with the seatback in a folded position, according to at least one embodiment.
Figure 8:
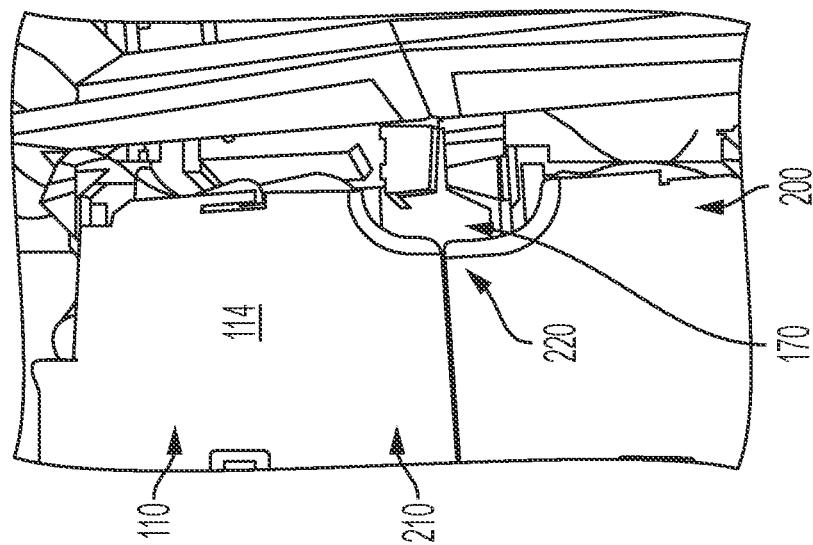
FIG. 8 is a top view of the rear surface of the vehicle seat, with the seatback in a folded position, according to at least one embodiment.

According to embodiments of the present disclosure, the seat assembly 100 includes a trim support member 300 for supporting the trim cover 210 in areas around the recess 170 and/or the seat belt buckles 160 such that the seat belt buckles 160 are not visible and/or hidden by the trim cover assembly 200 when the seatback 110 is in the folded (or loading) position on the seat bottom 120, as shown in FIGS. 8-9. The trim support member 300 provides structural support to the trim cover 210 in areas near the seat frame 400 (e.g., metal frame 400, hereinafter interchangeably used with seat frame 400) where the recess 170 does not include any structures or cushions 130, 150 for supporting the trim cover 210. The trim support member 300 will be further discussed with reference to FIGS. 2-5, as well as its engagement with the metal frame 400 to form the seat assembly 100, and its support provided to the trim cover assembly when the seat is in the folded position, with reference to FIGS. 6-9.

Figure 2:
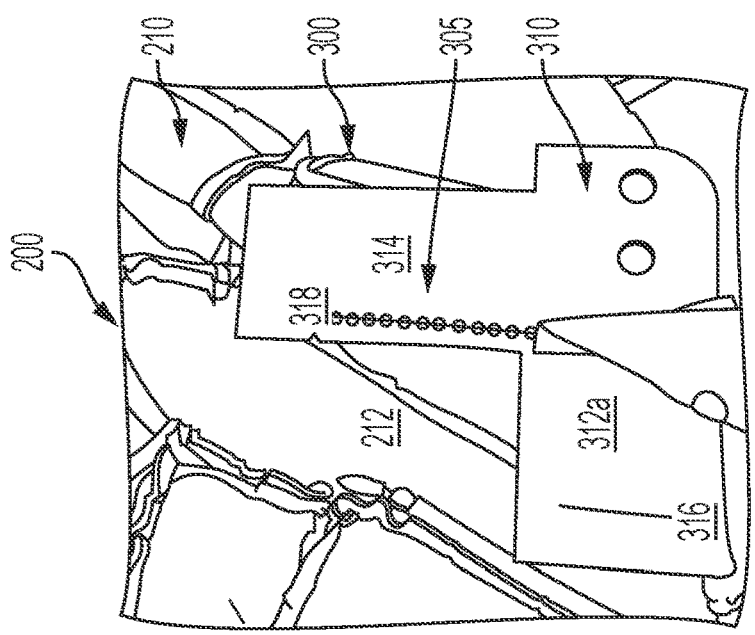
FIG. 2 shows a trim cover assembly, according to at least one embodiment.
Figure 7:
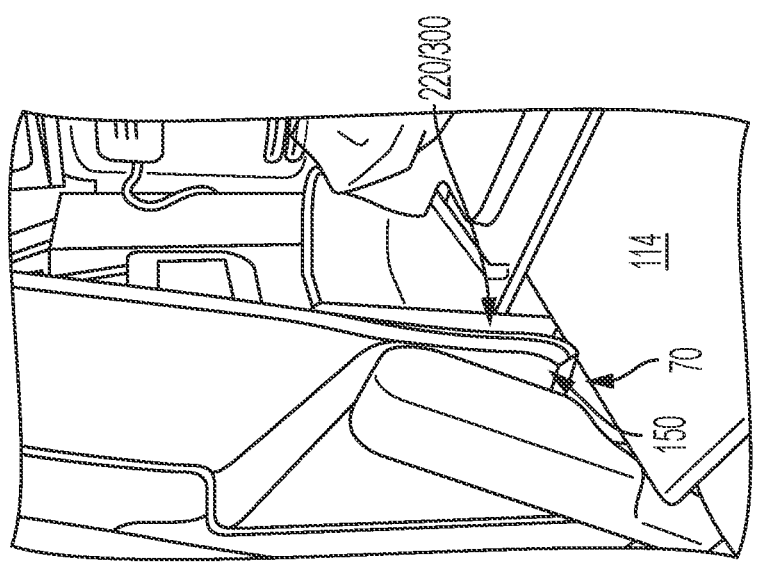
FIG. 7 is a enlarged view of the vehicle seat with the trim cover assembly of FIG. 6.
Figure 6:
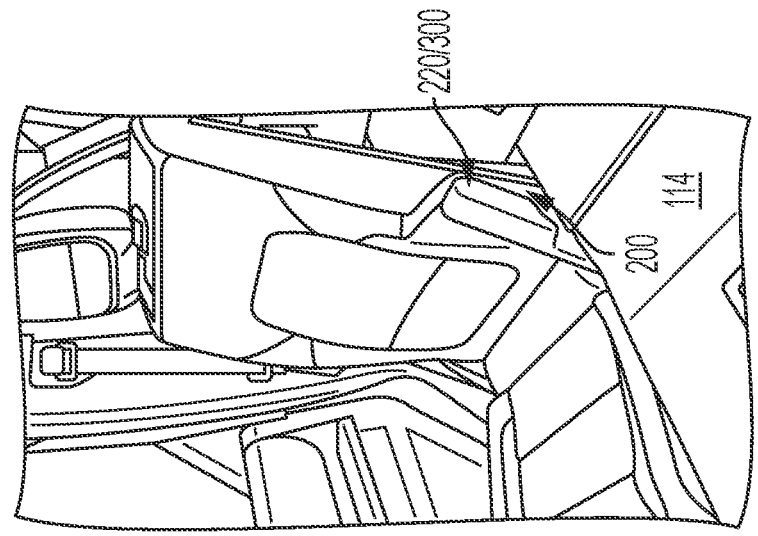
FIG. 6 is a perspective view of a vehicle seat with a trim cover assembly according to at least one embodiment.

Referring to FIG. 2, a trim cover assembly 200 is shown, according to one or more embodiments. The trim cover assembly 200 includes a trim cover 210, and is shown from the B-side 212 of the trim cover 210. The B-side 212 of the trim cover 210 is the opposite surface of the trim cover 210 from the occupant surface 112 of the seatback 110. The B-side 212 of the trim cover 210 defines one or more support areas 220. The shape of each support area 220 corresponds to the shape of a corresponding recess 170, and is located based on the position of the seat belt buckles 160. The support area 220 is positioned to cover the seat belt buckle 160 and recess 170 when the seatback 110 is in the folded position such that the seat belt buckles 160 and the recess 170 are hidden from view (see FIGS. 6-9). Thus, the support area 220 is aligned with the position of the seat belt buckles 160 and the recess 170 when the trim cover 210 is disposed on the seatback 110 such that the recess 170 and seat belt buckles 160 can be covered by the trim cover 210.

Referring again to FIG. 2, the trim cover assembly 200 further includes a trim support member 300 secured to the B-side 212 of the trim cover 210, as shown from the rear side, according to an embodiment. The trim support member 300 provides support to the trim cover 210 at the support area 220, which, as previously discussed, defines an area where the seat assembly 100 does not include other structural features for supporting the trim cover 210, such as, for example, the metal frame 400 or cushion 130, 150 near the components/recesses of the seat assembly 100 (for example, seat belt buckles 160 with the recesses 170). The trim support member 300 is attached on the B-side 212 of the trim cover 210. Although shown as being stitched via seams or stitching 305 to the trim cover 210, the trim support member 300 may be secured to the B-side 212 of the trim cover 210 in any suitable manner, including, but not limited to, via an adhesive, welding, mechanical fasteners, stitching, and the like. Moreover, although shown as stitched via continuous seams, the stitching may be on any suitable area of the trim support member as based on the shape of the trim support member 300 and/or the trim cover 210, and the seams need not be continuous. In some embodiments, each seam 305 may be up to 20 mm in length, in other embodiments 5-17.5 mm in length, and in yet other embodiments, 7.5-15 mm in length. In certain examples, the trim support member 300 may be attached to at least one layer of the trim cover 210 (e.g., one or more layers towards the B-side 212), and may not be visible from the A-side occupant support surface 112 of the trim cover 210.

In the embodiment shown in the Figures, the trim support member 300 has a body 310 with an A-surface side 312a, and a B-surface side 312b. The body 310 includes a first portion 314 and a second portion 316 forming a generally L-shape. Although the trim support member 300 is shown as having a generally L-shape, this is not intended to be limiting, and the trim support member 300 may have any shape as based on the desired design of the seat back 110 as it folds over, the shape of the recess 170, or the shape of the support area 220 as based on where the trim cover 210 requires support. As shown in FIGS. 2-5, the trim support member 300 generally has a shape which corresponds to the support area 220, defined where the metal frame 400 ends and would not support the support area 220 of the trim cover 210. As such, the body 310 provides a support region 315 corresponding to at least a portion of the support area 220. The body 310 includes an engagement region 318 (shown as a section of first portion 314) configured to attach to the metal frame 400 such that the trim support member 300 extends outwardly from the metal frame 400 in an area corresponding to the support region 220 to form a support extension of the metal frame 400 to provide support for the trim cover 210 at the support area 220. The metal frame 400 may include a receptacle 410 for receiving the corresponding engagement region 318. As such, the trim support member 300 is sized and shaped to correspond with the support area 220 of the trim cover 210 as based on the desired seat design, and the engagement region 318 is shaped and sized to be received in the receptacle 410 of the metal frame 400 when the trim cover 210 is to be secured to the seat 10.

Figure 4:
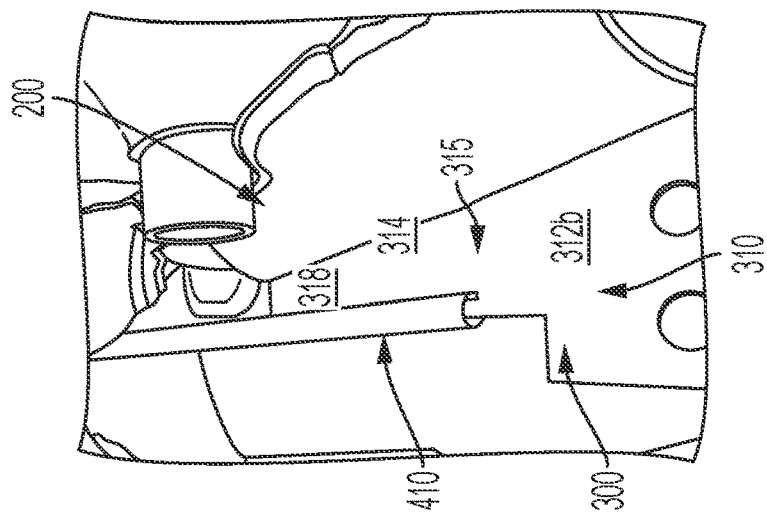
FIG. 4 shows the front view of the seat frame of FIG. 3 engaged with the trim cover assembly of FIG. 2.
Figure 3:
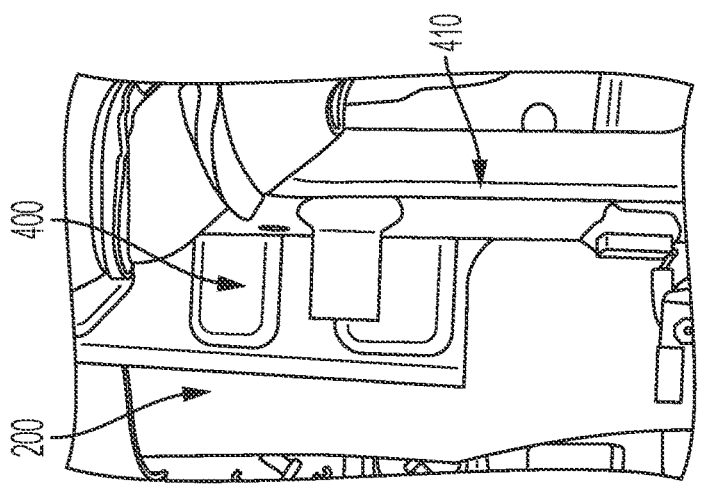
FIG. 3 shows a seat frame for engagement with the trim cover assembly of FIG. 2.
Figure 5:
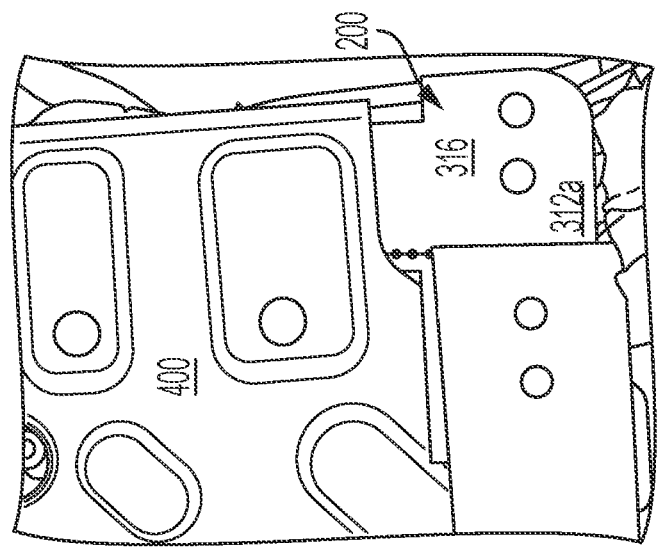
FIG. 5 shows a rear view of the seat frame engaged with the trim cover assembly of FIG. 4.

As shown in FIGS. 3-5, the body 310 of the trim support member 300 is secured to the metal frame 400 via engagement between the engagement region 318 and the receptacle 410 of the metal frame 400. The trim cover assembly 200 is aligned with the metal frame 400 such that the trim support member 300 engages with the receptacle 410 of the metal frame 400 to secure the trim support member 300 with the metal frame 400. The receptacle 410 may be any suitable area or feature of the metal frame 400 capable of receiving and/or engaging the trim support member 300 in any suitable manner (e.g., interference fit, snap fit, or other mechanical attachment). As shown in FIGS. 3-4, the receptacle 410 is a rolled edge of the metal frame 400, and the engagement region 318 of the trim support member 300 is fit into the metal frame 400 underneath the rolled edge, in receptacle 410. Although shown as an interference fit, the engagement region 318 of the trim support member 300 and the receptacle 410 of the metal frame 400 may be any suitable mating components, and depiction of the rolled edge embodiment is not intended to be limiting. For example, the engagement of the trim support member 300 and the metal frame 400 may be via snap fixtures, protrusions, adhesion, or any other suitable attachment between the components such that the trim support member 300 extends away from the metal frame to cover the recess area 170 when the trim cover 210 is disposed on the seat 100.

Moreover, although shown attached to the metal frame 400 at one location in FIG. 4, the trim support member 300 may be secured or otherwise supported against the metal frame 400 at other locations, separate from the A-side 312*a* of the trim support member 300 secured to the metal frame 400 at the engagement region 318, to provide further support to the support area 220 of the trim cover assembly 210 at the recess 170. For example, in the embodiments shown in FIG. 5, the body 310 is positioned on the metal frame 400, being secured at the engagement region 318 with the receptacle 410, with the second portion 316 of the trim support member 300 extending to a back side of the frame 400 (see FIG. 5) such that in addition to the engagement region 318 and receptacle 210 as shown in FIG. 4, the second portion 316 of the trim support member 300 is supported against the metal frame 400 at a portion of the second portion 316, with a portion of the second portion 316 extending toward and over a portion of the recess area 170. Thus, with the trim cover 210 going over the metal frame 400, the trim support member 300 forms a support band type structure for the trim cover 210 in areas around the metal frame 400, providing rigidity without requiring alteration of the design of the metal frame.

The profile shape of the trim support member 300 and the shape of the metal frame 400 need not be similar, and may generally be shaped to correspond such that the features can be connected such that the trim cover 210 is supported at the support area 220. Generally, the trim support member 300 may be sized according to the corresponding support area 220 to provide structural support to the trim cover 210 when the trim cover assembly 200 is installed on the seat assembly 100. The dimensions of the trim support member 300 may be designed to have any suitable size and shape as based on the required support around and based on engagement with and the shape of the metal frame 400. In one or more embodiments, the trim support member 300 may have thickness of 0.5 mm to 3 mm, in other embodiments, 0.75 mm to 2.5 mm, and in yet other embodiments, 1 mm to 2 mm. In certain embodiments the trim support member 300 has a thickness of 1.5 mm.

In one or more embodiments, the trim support member 300 may be any suitable material to provide structural support to the support area 220, including, but not limited to leather, fabric, or polypropylene. The material of the trim support member 300 generally has sufficient rigidity to maintain support the trim cover 210 around the metal frame 400 and engage with the receptacle 410, and maintain its shape and structure when the second portion 316 extends around the back side of metal frame 400 to better secure the trim cover assembly 200. For example, in some embodiments, the trim support member 300 may be made of polypropylene. Moreover, in certain embodiments, the material of the trim support member 300 may be configured to receive stitching therethrough upon application of a seam through the trim support member 300 and into the trim cover 210 to secure the trim support member to the B-side 212 of the trim cover 210. In certain embodiments, the material of the trim support member 300 may be selected such that the trim support member 300 can be secured to the trim cover 210 via an adhesive, stitching, welding, or by mechanical fastener(s), as previously discussed. As such, the trim support member 300 may be, in certain embodiments, a woven or non-woven material of sufficient rigidity to provide structural support to the trim cover assembly 200 and reduce wrinkling of the trim cover 210 near the seat belt buckles 160 and recesses 170 when the seatback 110 is folded and in the loading position. In certain embodiments, where the trim support member 300 is polypropylene and secured to the trim cover 210 via stitching 190, as shown in FIG. 2, the seams may be any suitable length for securing the trim support member 300 to the trim cover 210, and may be continuous or discontinuous seams, including in some embodiments, 1 to 20 mm, in other embodiments 2 to 18 mm, and in yet other embodiments 3 to 17 mm. In at least one embodiment, the total seam length may be up to 15 mm.

Referring to FIG. 8-9, a seat assembly 100 is shown with the seatback 110 in the loading position, with the trim cover assembly 200 disposed thereon with structural support provided by the trim support member 300 at the support area 220 where the metal frame 400 does not extend to provide a cover for the seat belt buckles 160 and the recesses 170 corresponding to the seat belt buckles 160. Various views of the seats are shown in FIGS. 6-9, with at least a section of the seatback 110 in the folded loading position, such that the covering relationship of the trim cover assembly 200 is shown for the rear surface 114 of the seatback 110.

According to another embodiment of the present disclosure, a method of assembling a seat with a trim cover assembly having a trim support member is provided. The method includes securing a trim support member on a B-side of the trim cover to at least one layer of the trim cover to form a trim cover assembly. The trim support member includes a body sized to correspond to a support area of the trim cover, the body defining an engagement region. The method further includes positioning the trim cover assembly on metal frame having a receptacle defined thereon. The method further includes securing the trim cover assembly to the metal frame by engaging the engagement region of the support member with the receptacle such that the trim support member is a structural extension of the metal frame providing support to the trim cover at the support area. The trim support member may also include a back region to wrap around the metal frame to a different side of the metal frame from the receptacle to further support the trim cover assembly thereon. The securing of the trim support member to the trim cover may be by stitching, via an adhesive, by welding, or via mechanical fasteners, and the positioning may include aligning and engaging the support region with the receptacle in an interference or other mechanical fit, and in some embodiments, without additional fastening components.

According to one or more embodiments, a trim cover assembly includes a trim cover defining a support area corresponding to an area of a seat assembly with seat belt buckles and recesses for the seatbelt buckles in the seat assembly, when the trim cover assembly is covering a seat. The trim cover assembly also includes a trim support member on the B-side of the trim cover positioned according to the support area. The trim cover assembly is configured to be disposed on the seat, with the trim support member engaging a metal frame to form an extension of the frame and provide structural support to the support area. The trim cover is thus supported by the trim support member in areas where the metal frame is not present, and allows for covering of the seat belt buckles and recesses when the seatback is folded in a loading position, with the trim support member improving the finish and closeout appearance of the rear surface of the trim cover.

Except in any examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. As used herein, the term "about" means that the amount or value in question may be the specific value designated or some other value in its neighborhood. The term "about" or "generally" denoting a certain value is intended to denote a range within +/−5% of the value. As one example, the phrase "about 10" denotes a range of 10+/−5, i.e. the range from 95 to 105. When the term "about" or "generally" is used, it can be expected that similar results or effects according to the invention can be obtained within a range of +/−5% of the indicated value. It should also be appreciated that integer ranges (e.g., for measurements or dimensions) explicitly include all intervening integers. For example, the integer range 1-10 explicitly includes 1, 2, 3, 4, 5, 6, 7, 8, 9, and 10. Similarly, the range 1 to 10 includes 1, 2, 3, 4, . . . 97, 98, 99, 10. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended aspects, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

While the vehicle seat assembly 100 is illustrated in FIG. 1 to be a bench seat assembly, it should be understood that the principles of the present invention are applicable to other types of seat assemblies, such as bucket, captain, and other types of seat assemblies. Also, while the present disclosure will be described in connection with a seat back, it should also be understood that the principles of the present invention are applicable to other applications where the trim cover is in a covering relationship with seat components, such as seat belt components, bezels, and other features in seatbacks, seat bottoms, armrests, and head restraints.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly, comprising:
a seat having an occupant surface formed by a cushion disposable on a seat frame, and a corresponding seat belt buckle, the seat defining a recess sized to receive a portion of the seat belt buckle; and
a trim cover assembly disposed over the seat in a covering relationship, the trim cover assembly including:
a trim cover having an A-side corresponding to the occupant surface and a B- side, opposite the A-side, facing an external surface of the cushion, with the trim cover defining a support area generally corresponding to the seat belt buckle and the recess; and
a trim support member secured to the B-side of the trim cover, the trim support member having a body shape corresponding to at least a portion of the support area and a shape of the recess,
wherein the trim support member is securable to the seat frame to form a support extension of the seat frame for supporting the support area of the trim cover to cover the recess and the seat belt buckle.

2. The seat assembly of claim 1, wherein the seat has a sitting position for an occupant and a folded position for loading cargo, and at least a portion of the recess and the seat belt buckle are covered by the support area of the trim cover when the seat is in a folded position, wherein a shape of the support area corresponds to the shape of the recess and the support area is positioned based on a position of the seat belt buckle.

3. The seat assembly of claim 1, wherein the seat frame includes a receptacle for engaging an engagement region of the body of the trim support member to form the support extension.

4. The seat assembly of claim 1, wherein the trim support member is made up of polypropylene.

5. The seat assembly of claim 1, wherein the trim support member is to be secured to at least one layer of the trim cover on the B-side via stitching.

6. The seat assembly of claim 1, wherein a thickness of the trim support member is within a range from about 0.5 mm to about 3 mm thick.

7. The seat assembly of claim 3, wherein the trim support member includes a first portion as an engagement region, the first portion engaging the receptacle on a first side of the seat frame, and a second portion engaging a second side of the seat frame, the second side being opposite to the first side.

8. A trim cover assembly, comprising:
a trim cover disposable over a seat cushion, the trim cover having an A-side defining an occupant surface and a B-side, opposite the A-side, facing an external surface of the seat cushion, with the trim cover defining a support area which, when disposed over the seat cushion, corresponds to a seat belt buckle and a recess corresponding to the seat belt buckle; and a trim support member secured on the B-side of the trim cover, the trim support member corresponding to at least a portion of the support area and a shape of the recess, and defining an engagement region for engaging a seat frame to form a support extension from the seat frame to provide support to the support area of the trim cover over at least a portion of the seat belt buckle and the recess.

9. The trim cover assembly of claim 8, wherein the support area covers the recess and the seat belt buckle of a seat, when the seat is in a folded position for loading cargo.

10. The trim cover assembly of claim 8, wherein the seat frame includes a receptacle engageable with the engagement region.

11. The trim cover assembly of claim 8, wherein the trim support member is made up of polypropylene.

12. The trim cover assembly of claim 8, wherein the trim support member includes a first portion engageable with a first side of the seat frame, and a second portion engageable with a second side of the seat frame, the second side being opposite the first side.

13. The trim cover assembly of claim 8, wherein the trim support member is secured to at least one layer of the trim cover on the B-side by stitching.

14. A method, comprising:

securing a trim support member on a B-side of a trim cover, the trim support member defining a support region for a support area of the trim cover corresponding to a seat belt buckle and recess of a seat, to form a trim cover assembly; and disposing the trim cover assembly over a seat having a seat frame by engaging the trim support member with the seat frame to form a support extension of the seat frame to support the trim cover at the support area over at least a portion of the seat belt buckle and the recess of the seat, the trim support member having a body shape corresponding to at least a portion of the support area and a shape of the recess.

15. The method of claim 14, wherein securing the trim support member includes stitching the trim support member to at least one layer of the trim cover on the B-side.

16. The method of claim 14, wherein engaging the trim support member with the seat frame is via engagement of an engagement region of the trim support member with a receptacle on the seat frame.

17. The method of claim 16, wherein the receptacle is formed by a rolled edge of the seat frame.

18. The method of claim 14, wherein the trim support member is made up of polypropylene.

19. The method of claim 14, wherein a thickness of the trim support member is within a range from about 0.5 mm to about 2 mm.

20. The method of claim 19, wherein the trim support member includes a first portion engaging a first side of the seat frame, and a second portion engaging a second side of the seat frame, the second side being opposite the first side.

* * * * *